US007984279B2

(12) United States Patent
Stempel et al.

(10) Patent No.: US 7,984,279 B2
(45) Date of Patent: Jul. 19, 2011

(54) SYSTEM AND METHOD FOR USING A WORKING GLOBAL HISTORY REGISTER

(75) Inventors: Brian Michael Stempel, Raleigh, NC (US); James Norris Dieffenderfer, Apex, NC (US); Thomas Andrew Sartorius, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 11/556,244

(22) Filed: Nov. 3, 2006

(65) Prior Publication Data

US 2008/0109644 A1   May 8, 2008

(51) Int. Cl.
 *G06F 9/00* (2006.01)
(52) U.S. Cl. .................. 712/237; 712/239; 712/240
(58) Field of Classification Search .............. 712/233, 712/237, 238, 239, 240
See application file for complete search history.

(56) References Cited

U.S. PATENT DOCUMENTS

| 5,155,818 | A | * | 10/1992 | Stein et al. ............... 712/234 |
| 5,604,877 | A | * | 2/1997 | Hoyt et al. ............... 712/243 |
| 5,768,576 | A | * | 6/1998 | Hoyt et al. ............... 712/238 |
| 5,860,017 | A | * | 1/1999 | Sharangpani et al. ...... 712/23 |
| 6,622,240 | B1 | * | 9/2003 | Olson et al. .............. 712/233 |
| 6,647,467 | B1 | * | 11/2003 | Dowling .................. 711/140 |
| 7,107,438 | B2 | * | 9/2006 | Col ........................ 712/239 |
| 2002/0038417 | A1 | * | 3/2002 | Strombergsson et al. .... 712/239 |
| 2004/0158697 | A1 | * | 8/2004 | Col ........................ 712/239 |
| 2004/0225866 | A1 | * | 11/2004 | Williamson ............... 712/207 |
| 2005/0132175 | A1 | | 6/2005 | Henry |
| 2005/0228977 | A1 | * | 10/2005 | Cypher et al. ............ 712/240 |
| 2006/0095750 | A1 | * | 5/2006 | Nye et al. ................ 712/240 |
| 2006/0277397 | A1 | * | 12/2006 | Sartorius et al. .......... 712/240 |
| 2007/0174599 | A1 | * | 7/2007 | Dowling .................. 712/239 |
| 2007/0239975 | A1 | * | 10/2007 | Wang ..................... 712/241 |

FOREIGN PATENT DOCUMENTS

EP   0706121   4/1996
EP   1592272 A2   11/2005

OTHER PUBLICATIONS

Yamour; "Instruction Scan for an Early Resolution of a Branch Instruction"; IBM Technical Disclosure Bulletin USA; vol. 23, No. 6; Nov. 1980; pp. 2600-2604; XP002465592; ISSN: 0018-8689.
International Search Report—PCT/US07/082538, International Search Authority—European Patent Office—Feb. 20, 2008.
Written Opinion—PCT/US07/082538, International Search Authority—European Patent Office—Feb. 20, 2008.

* cited by examiner

*Primary Examiner* — Idriss N Alrobaye
(74) *Attorney, Agent, or Firm* — Peter M. Kamarchik; Nicholas J. Pauley; Jonathan T. Velasco

(57) ABSTRACT

A method of processing branch history information is disclosed. The method retrieves branch instructions from an instruction cache and executes the branch instructions in a plurality of pipeline stages. The method verifies that a branch instruction has been identified. The method further receives branch history information during a first pipeline stage and loads the branch history information into a first register. The method further loads the branch history information into the second register during the second pipeline stage.

18 Claims, 8 Drawing Sheets

BRANCH HISTORY TABLE (BHT)

|  | PROCESSOR CYCLE 1 | PROCESSOR CYCLE 2 | PROCESSOR CYCLE 3 | PROCESSOR CYCLE 4 | PROCESSOR CYCLE 5 | PROCESSOR CYCLE 6 | PROCESSOR CYCLE 7 | PROCESSOR CYCLE 8 |
|---|---|---|---|---|---|---|---|---|
| IC1 | A, A+4 | A+8, A+12 | B, B+4 | B+8, B+12 | B+16, B+20 | C, C+4 | - | - |
| IC2 |  | A, A+4 | - | B, B+4 | B+8, B+12 | - | C, C+4 | - |
| IDA |  |  | A | - | B, B+4 | B, B+4 | - | C, C+4 |
| DCD |  |  |  | A | - | - | B+8 | - |
| WGHR | 000 | 000 | 100 | 100 | 100 | 110 | 110 | 110 |
| GHR | 000 | 000 | 000 | 000 | 100 | 100 | 100 | 110 |

FIG. 6

| Instruction Address | Operation |
|---|---|
| A: | Branch Conditionally to B |
| A+4: | Instruction |
| A+8: | Instruction |
| A+12: | Instruction |
| B: | Instruction |
| B+4: | Instruction |
| B+8: | Branch Conditionally to C |
| B+12: | Instruction |
| B+16: | Instruction |
| B+20: | Instruction |
| C: | Instruction |
| C+4: | Instruction |

SYSTEM AND METHOD FOR USING A WORKING GLOBAL HISTORY REGISTER

BACKGROUND

1. Field of Invention

The present invention relates generally to computer systems, and more particularly to a method and a system for using a working global history register.

2. Relevant Background

At the heart of the computer platform evolution is the processor. Early processors were limited by the technology available at that time. New advances in fabrication technology allow transistor designs to be reduced up to and exceeding $1/1000^{th}$ of the size of early processors. These smaller processor designs are faster, more efficient and use substantially less power while delivering processing power exceeding prior expectations.

As the physical design of the processor evolved, innovative ways of processing information and performing functions have also changed. For example, "pipelining" of instructions has been implemented in processor designs since the early 1960's. One example of pipelining is the concept of breaking execution pipelines into units or stages, through which instructions flow sequentially in a stream. The stages are arranged so that several stages can be simultaneously processing the appropriate parts of several instructions. One advantage of pipelining is that the execution of the instructions is overlapped because the instructions are evaluated in parallel.

A processor pipeline is composed of many stages where each stage performs a function associated with executing an instruction. Each stage is referred to as a pipe stage or pipe segment. The stages are connected together to form the pipeline. Instructions enter at one end of the pipeline and exit at the other end.

Most programs executed by the processor include conditional branch instructions, the actual branching behavior of which is not known until the instruction is evaluated deep in the pipeline. To avoid a stall that would result from waiting for actual evaluation of the branch instruction, modern processors may employ some form of branch prediction, whereby the branching behavior of a conditional branch instruction is predicted early in the pipeline. Based on the predicted branch evaluation, the processor speculatively fetches and executes instructions from a predicted address—either the branch target address (if the branch is predicted to be taken) or the next sequential address after the branch instruction (if the branch is predicted not to be taken). Whether a conditional branch instruction is taken or not taken is referred to as determining the direction of the branch. Determining the direction of the branch may be made at prediction time and at actual branch resolution time. When the actual branch behavior is determined, if the branch was mispredicted, the speculatively fetched instructions must be flushed from the pipeline, and new instructions fetched from the correct address. Speculatively fetching instructions in response to an erroneous branch prediction can adversely impact processor performance and power consumption. Consequently, improving the accuracy of branch predictions is an important processor design goal.

One known form of branch prediction includes partitioning branch prediction into two predictors: an initial branch target address cache (BTAC) and a branch history table (BHT). The BTAC is indexed by an instruction fetch group address and contains the next fetched address, also referred to as the branch target, corresponding to the instruction fetch group address. Entries are added to the BTAC after a branch instruction has passed through the processor pipeline and its branch has been taken. If the BTAC becomes full, entries are removed from the BTAC using standard cache replacement algorithms (such as round robin or least-recently used) when the next entry is being added.

The BTAC may be a highly-associative cache design and is accessed early in the instruction execution pipeline. If the fetch group address matches a BTAC entry (a BTAC hit), the corresponding next fetch address or target address is fetched in the next cycle. This match and subsequent fetching of the target address is referred to as an implicit taken branch prediction. If there is no match (a BTAC miss), the next sequentially incremented address is fetched in the next cycle. This no match situation is also referred to an implicit not-taken prediction.

BTACs may be utilized in conjunction with a more accurate individual branch direction predictor such as a branch history table (BHT) also known as a pattern history table (PHT). A conventional BHT may contain a set of saturating predicted direction counters to produce a more accurate taken/not-taken decision for individual branch instructions. For example, each saturating predicted direction counter may comprise a 2-bit counter that assumes one of four states, each assigned a weighted prediction value, such as:

11—Strongly predicted taken
10—Weakly predicted taken
01—Weakly predicted not taken
00—Strongly predicted not taken The output of a conventional BHT, also referred to as a prediction value, is a taken or not taken decision which results in either fetching the target address of the branch instruction or the next sequential address in the next cycle. The BHT is commonly updated with branch outcome information as it becomes known.

In order to increase the accuracy of branch predictions, various other prediction techniques may be implemented which use recent branch history information from other branches as feedback. As those skilled in the art appreciate, current branch behavior may be correlated to the history of previously executed branch instructions. For example, the history of previously executed branch instructions may influence how a conditional branch instruction is predicted.

A Global History Register (GHR), also referred to in the art as a global branch history register or a global history shift register, may be used to keep track of the past history of previously executed branch instructions. As stored by the GHR, the branch history provides a view of the sequence of branch instructions encountered in the code path leading up to the presently executed branch instruction in order to achieve improved prediction results.

In some processors, identification of a branch instruction and its associated prediction information may occur only after an instruction decode stage. Commonly, the instruction decode stage may be a later stage in the instruction execution sequence. After an instruction is decoded and confirmed as a branch instruction, the GHR is loaded with appropriate branch history information. As the branch history information is identified it is shifted into the GHR. The output of the GHR is used to identify the prediction value stored in the BHT which is used to predict the next conditional branch instruction.

In a conventional processor using a GHR, the GHR may not reflect the actual branch history information encountered when multiple branch instructions are executed in parallel during a relatively short period of time. In this instance, the GHR may not be updated with the branch history information from the first branch instruction before the second branch instruction is predicted. As a result, an inaccurate value of the GHR may be used to identify the entry in the BHT for the second conditional branch instruction. Using an inaccurate value to index the entry in the BHT may affect the accuracy of the branch prediction. If the processor had been able to keep pace with the branch history information from the first conditional branch instruction, a different value would have been stored in the GHR and a different entry in the BHT would have been identified for the second conditional branch instruction.

SUMMARY

Accordingly, there exists a need in the industry to have a processor that may store and use branch history information sooner than the GHR in order to achieve more accurate branch predictions. The present disclosure recognizes this need and discloses a processor which identifies branch instructions early in the execution stages of the processor. Using the branch instruction information as input, the processor may steer the selection of prediction values for subsequent conditional branch instructions.

A method of processing branch history information is disclosed. The method identifies branch instructions during a first pipeline stage and loads the branch history information in a first register during the first pipeline stage. The method confirms the branch instructions in a second pipeline stage and the branch history information is loaded into a second register during the second pipeline stage.

A pipeline processor comprising a first register having branch history information and a second register having branch history information is disclosed. The pipeline processor has a plurality of pipeline stages wherein the first register is loaded with the branch history information in a first pipeline stage when a branch instruction is identified and, a second register is loaded with branch history information during a second pipeline stage.

A method of processing branch history information is disclosed. The method fetches a branch instruction, identifies the branch instructions during a first pipeline stage and loads the branch history information in a first register during the first pipeline stage. The method confirms the branch instructions in a second pipeline stage and the branch history information is loaded into a second register during the second pipeline stage.

A more complete understanding of the present invention, as well as further features and advantages of the invention, will be apparent from the following detailed description and the accompanying drawings.

BRIEF DESCRIPTION OF THE DRAWINGS

FIG. 6 shows a timing diagram of an exemplary group of instructions as they are executed through various stages of the processor of FIG. 1.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Figure 1:
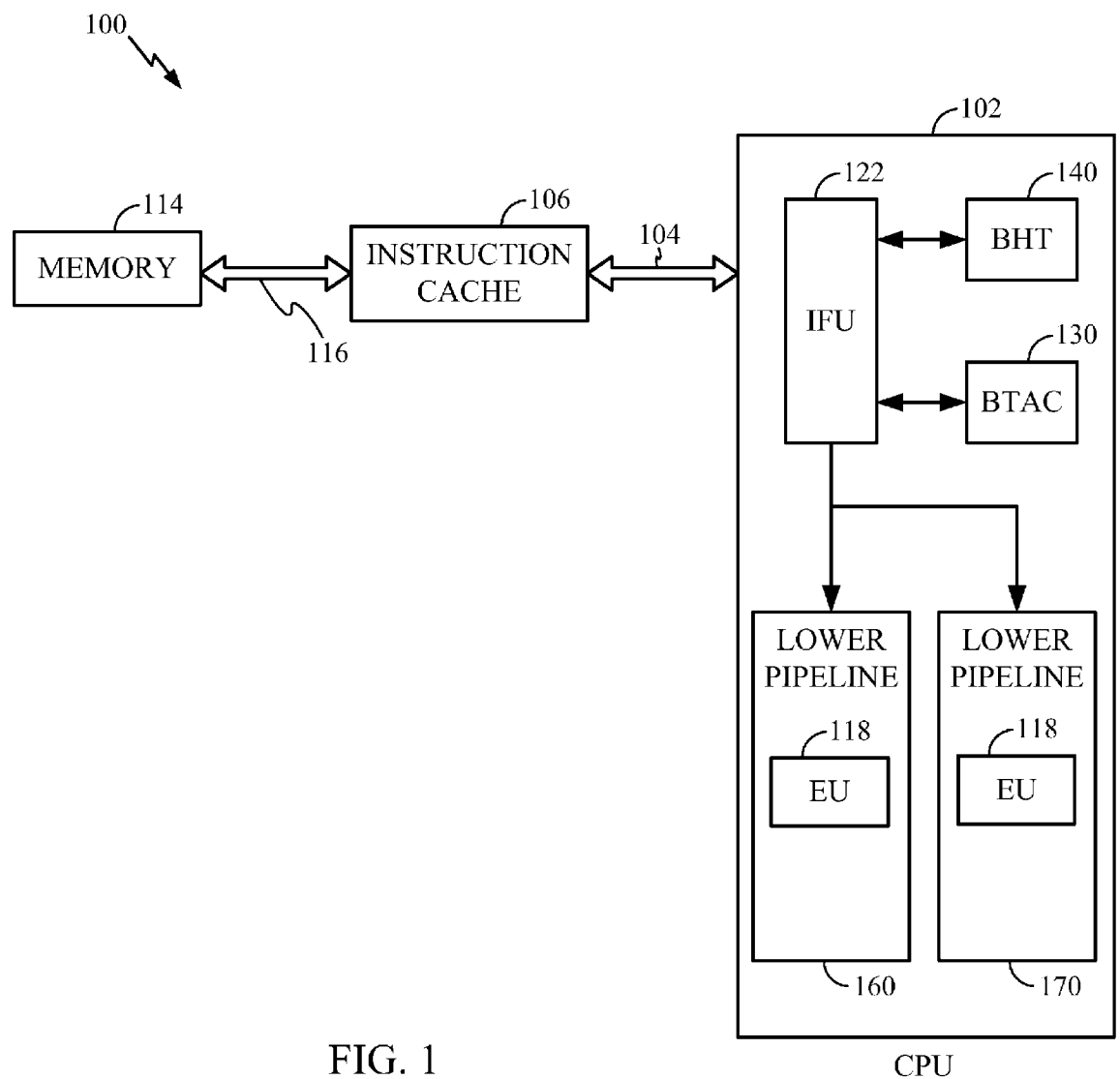
FIG. 1 shows a high level logic hardware block diagram of a processor using an embodiment of the present invention.

FIG. 1 shows a high level view of a superscalar processor 100 utilizing an embodiment as hereinafter described. The processor 100 has a central processing unit (CPU) 102 that is coupled via a dedicated high speed bus 104 to an instruction cache 106. The instruction cache is also coupled via a general purpose bus 116 to memory 114.

Within the processor 100, an Instruction Fetch Unit (IFU) 122 controls the loading of instructions from memory 114 into the instruction cache 106. Once the instruction cache 106 is loaded with instructions, the CPU 102 is able to access them via the high speed bus 104. The instruction cache 106 may be a separate memory structure as shown in FIG. 1, or it may be integrated as an internal component of the CPU 102. The integration may hinge on the size of the instruction cache 106 as well as the complexity and power dissipation of the CPU 102. Also coupled to the IFU 122 is a Branch Target Address Cache 130 (BTAC), a Branch History Table 140 (BHT) and two lower pipelines 160 and 170.

Instructions may be fetched and decoded from the instruction cache 106 several instructions at a time. Within the instruction cache 106 instructions are grouped into sections known as cache lines. Each cache line may contain multiple instructions as well as associated data. The number of instructions fetched may depend upon the required fetch bandwidth as well as the number of instructions in each cache line. Within the IFU 122, the fetched instructions are analyzed for operation type and data dependencies. After analyzing the instructions, the processor 100 may distribute the instructions from the IFU 122 to lower functional units or lower pipelines 160 or 170 for further execution.

Lower pipelines 160 and 170 may contain various Execution Units (EU) 118 including arithmetic logic units, floating point units, store units, load units and the like. For example, an EU 118 such as an arithmetic logic unit may execute a wide range of arithmetic functions, such as integer addition, subtraction, simple multiplication, bitwise logic operations (e.g. AND, NOT, OR, XOR), bit shifting and the like. Additionally, the lower pipelines 160 and 170 may have a resolution stage (not shown), during which the actual results of a conditional branch instruction are identified. Once the actual results of the branch instruction are identified, the processor 100 may compare the actual results to the predicted results and, if they don't match, a mispredict has occurred.

Those skilled in the art appreciate that the BTAC 130 may be similar to a Branch Target Buffer (BTB) or a Branch Target Instruction Cache (BTIC). A BTB or BTIC stores both the address of a branch and the instruction data (or opcodes) of the target branch. For ease of illustration, the BTAC 130 is used in conjunction with the various embodiments of the present invention. Other embodiments of the invention may alternatively include a BTB or BTIC instead of the BTAC 130.

The first time a branch instruction is executed, there is no entry in the BTAC 130 and a BTAC miss occurs. After the branch instruction finishes its execution, the BTAC 130 may be subsequently updated to reflect the target address of the particular conditional branch instruction as well as a processor mode (e.g. Arm vs. Thumb operation in the advanced RISC processor architecture). Any time thereafter that the branch instruction is fetched again, the information stored in the BTAC 130 will be fetched on the next processor cycle, even without completely decoding the fetched branch instruction.

A BTAC hit (e.g. when the fetch group address matches an address in the BTAC 130) may occur for either a conditional or unconditional branch instruction. This is due to the fact that the BTAC 130 may store information relating to both conditional branch instructions as well as unconditional branch instructions. In the case of a BTAC hit for an unconditional branch instruction, the predicted target address, predicted mode of the processor as well as the fact that the branch instruction is unconditional may be stored. In situations where an unconditional branch instruction address is stored in an entry in the BTAC 130, the entry will indicate a branch direction of taken.

Figure 2:
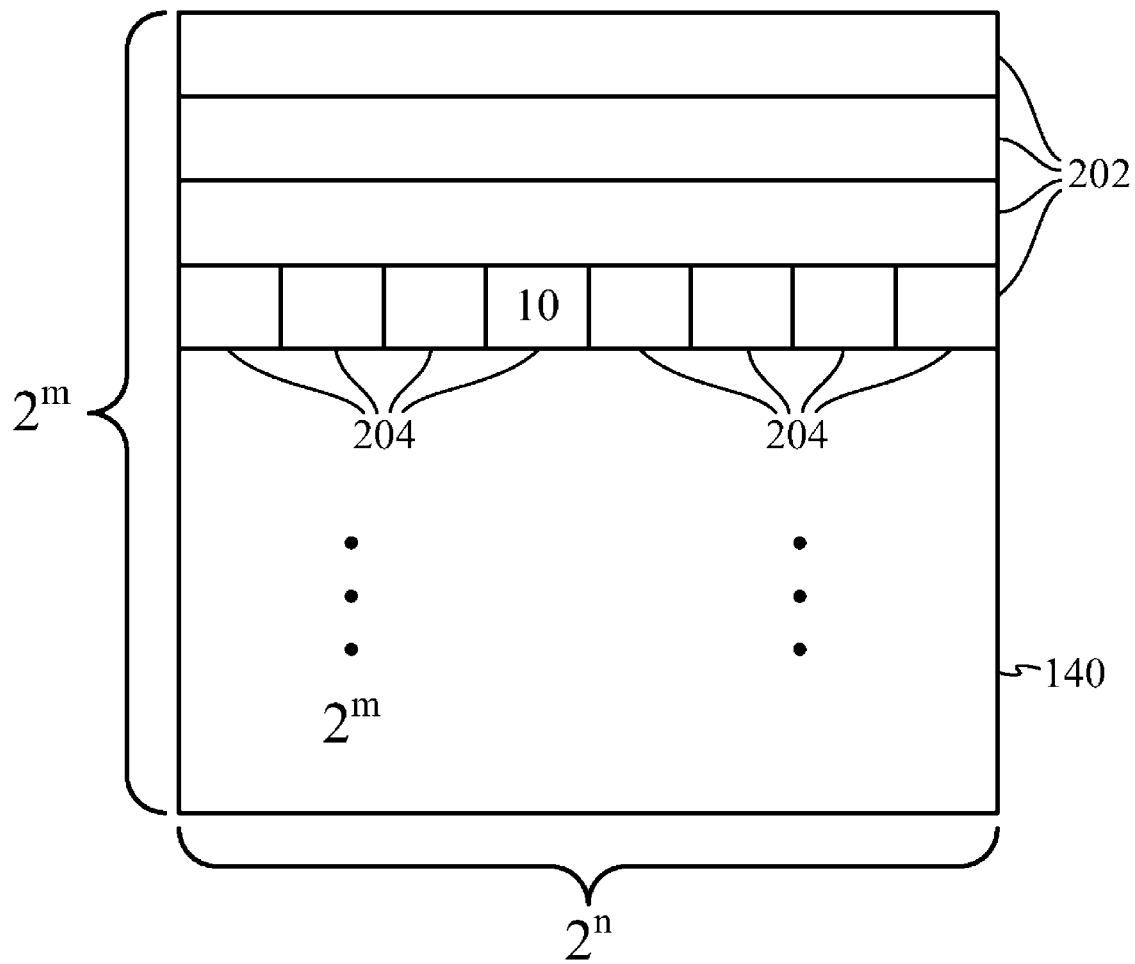
FIG. 2 displays an exemplary branch history table used by the processor of FIG. 1.

FIG. 2 displays a more detailed illustration of an exemplary Branch History Table (BHT) 140 used by the processor 100. The BHT 140 may be organized into $2^m$ lines 202 which are indexed using an address having m address bits. In one embodiment, nine bits of address are used which results in a BHT 140 having 512 lines. Within each line 202 there are $2^n$ counters 204, where n is the number of bits used to select the appropriate counter. Additionally, 3 bits of address may be used to select the counter 204, resulting in a BHT 140 that has eight counters 204 per line 202. In one exemplary embodiment, fetch group address bits 12 through 4 may be used to select the line 202 in the BHT 140. Bits 3-1 of the fetch group address may be used to select the specific counter 204.

Figure 3:
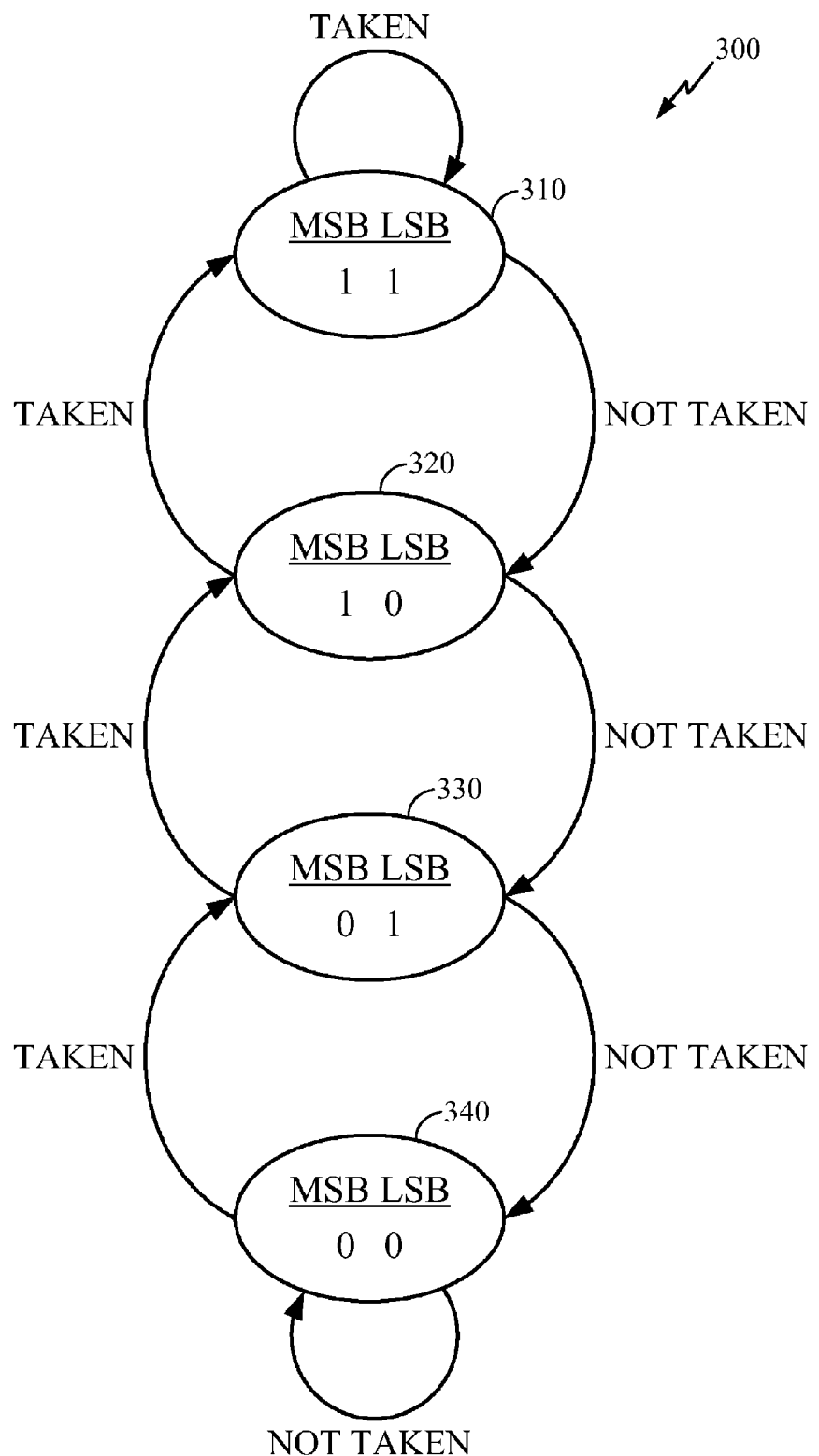
FIG. 3 shows a state transition diagram.

The processor 100 may identify branch instructions earlier in the instruction execution process prior to an instruction decode stage. When branch instructions are identified earlier, branch history information, such as the prediction value (conditional branch instruction) or taken branch direction (unconditional branch instruction) may also be identified at the same time. A Working Global History Register (WGHR), as will be described in the discussion of FIG. 4, may be used by the processor 100 to receive and process the branch history information earlier in the instruction execution process. For example, a WGHR may store the prediction values of conditional branch instructions as well as branch directions of unconditional branch instructions. Alternatively, a WGHR may store only the prediction values of conditional branch instructions. The output of the WGHR may be employed to index a corresponding entry in the BHT 140 for the next conditional branch instruction. FIG. 3 shows a state transition diagram 300. A state 310, having a most significant bit of 1 and a least significant bit of 1, may transition to a state 320, having a most significant bit of 1 and a least significant bit of 0. The state 310 may also transition into itself. The state 320 may transition to a state 330, having a most significant bit of 0 and a least significant bit of 1. The state 330 may transition to a state 340, having a most significant bit of 0 and a least significant bit of 0. The state 340 may transition into itself. The state 340 may also transition to the state 330, which may also transition to the state 320, which may also transition to the state 310.

Figure 4:
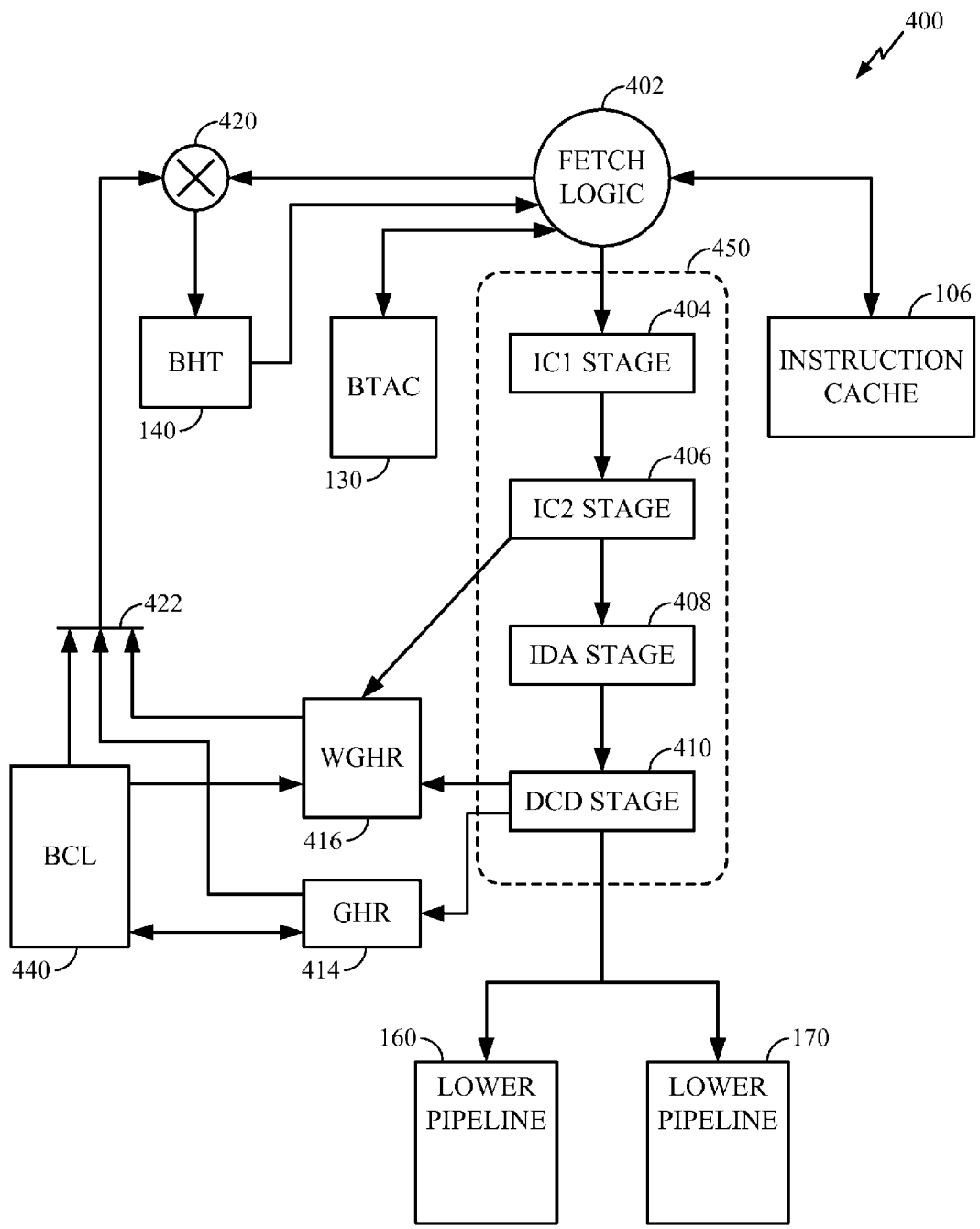
FIG. 4 shows a lower level logic block diagram of the processor of FIG. 1 employing a Working Global History Register.

FIG. 4 displays a lower level logic block diagram 400 of the processor 100 including a Working Global History Register (WGHR) 416. In the lower level block diagram 400 is an upper pipe 450. Coupled to the top of the upper pipe is fetch logic circuit 402. The upper pipe 450 includes four instruction execution stages, an Instruction Cache 1 Stage (IC1) 404, an Instruction Cache 2 Stage (IC2) 406, an Instruction Data Alignment Stage (IDA) 408 and a Decode Stage (DCD) 410. It should be noted that pipe stages may be added to or subtracted from upper pipe 450 without limiting the scope of the present disclosure. The fetch logic circuit 402 as well as the upper pipe 450, the Working Global History Register (WGHR) 416, Global History Register (GHR) 414, Branch Correction logic circuit (BCL) 440, selection mux 422, and address hashing logic circuit 420 may also be located within the IFU 122.

As the processor 100 begins executing instructions, the fetch logic circuit 402 determines what instructions are to be fetched during the IC1 stage 404. In order to retrieve the instructions, the fetch logic circuit 402 sends the fetch group address to the Instruction Cache 106. If the fetch group address is found within the Instruction Cache 106 (e.g. an instruction cache hit) the instructions are read from the hit cache line in the Instruction Cache 106 during the IC2 stage 406.

In parallel, during the IC1 stage 404, the processor 100 sends the fetch group address to the BTAC 130. If the processor 100 encounters a BTAC hit, the information stored within the BTAC for the fetch group address is received during the IC2 Stage 406. As mentioned previously, information stored within the BTAC 130 may include branch information such as a branch target, processor mode, as well as a taken branch direction (in the case of an unconditional branch instruction).

Also during the IC1 stage 404, the fetch logic sends the fetch group address to the address hashing logic circuit 420. Within the addressing hashing logic circuit 420, bits 12-4 of the fetch group address are exclusively or'd (XOR'd) with the output of the selection mux 422. The output of the address hashing logic circuit 420 (e.g. the XOR function) provides the address index into the BHT 140. As mentioned previously, bits 3-1 of the fetch group address may provide the selection bits to select the appropriate counter 204.

During the IC2 stage 406, the processor 100 reads the results from sending the instruction fetch group address to the Instruction Cache 106, the BTAC 130 and the BHT 140. In the IC2 stage 406, the processor 100 determines if a BTAC hit has occurred. When a BTAC hit is confirmed during the IC2 stage 406 the processor 100 also determines if the branch is a conditional or unconditional branch instruction. In the IC2 stage 406 the prediction value from the BHT 140 is also received and stored.

Since each cache line in the Instruction Cache 106 may contain multiple instructions, the individual instructions may need to be separated from a cache line. As well, data may be intertwined with the instructions in the cache line. The information from the cache line may need to be formatted and aligned in order to properly analyze and execute the instructions. The alignment and formatting of the instructions into individual executable instructions occurs during the IDA stage 408.

After the instructions are processed during the IDA stage 408, they pass through the Decode (DCD) stage 410. During the DCD stage 410, the instructions are analyzed to determine the type of instruction and what additional information or resources may be required for further processing. Depending on the type of instruction or the current instruction load, the processor 100 may hold the instruction in the DCD stage 410 or the processor 100 may pass it on to either of the lower pipelines 160 or 170 for further execution. In the DCD stage 410 the processor 100 confirms the instruction as a conditional branch instruction and confirms the instruction's prediction value (read during the IC2 stage 406) from the BHT 140. The accuracy of the prediction value will be verified during a later stage of instruction execution in either of the lower pipelines 160 or 170. Until a branch prediction is determined to be incorrect (e.g. a mispredict), the processor 100 assumes that the prediction value is the true value and proceeds fetching instructions based on this prediction.

Coupled to the upper pipe 450 is the Working Global History Register 416 (WGHR). The WGHR 416 allows the processor 100 to store and process branch history information associated with branch instructions which have been identified prior to the DCD stage 410. In one embodiment, the WGHR 416 may be loaded with the prediction value from the BHT 140 for a conditional branch instruction when a BTAC hit occurs. As stated previously, a BTAC hit signifies that the instruction being fetched is a branch instruction and has associated branch history information (e.g. prediction value for a conditional branch instruction or a taken direction for an unconditional branch instruction). Based on this condition, the processor 100 can utilize the branch history information earlier for subsequent branch predictions (i.e the branch history information is more current) as opposed to waiting until the branch instruction is confirmed during the DCD stage 410. The output of the WGHR 416 is sent to the address hashing logic circuit 420 to determine the address index for the next entry in the BHT 140.

When the branch history information becomes available is dependent upon on how fast the branch history information may be retrieved from the BHT 140 and how fast a BTAC hit may be acknowledged. In some processor designs, the branch history information and BTAC hit may be received during the IC2 stage 406. In other processor designs, the branch history information and BTAC hit may be received during the IDA stage 408. In yet other processor designs incorporating stages other than the stages previously described, branch history information and BTAC hit may be available during those stages prior to a decoding stage.

In one embodiment, the branch history information for conditional branch instructions is shifted in to the WGHR 416 during the IC2 stage 406 (when a BTAC hit occurs). In yet another embodiment, branch history information for both conditional branch instructions and unconditional branch instructions are shifted into the WGHR 416. In a further embodiment, the WGHR 416 may be updated during the IDA stage 408 with branch history information. This situation may occur when the prediction value stored in the BHT 140 or the BTAC hit information is not available until the IDA stage 408.

The selection mux 422 is configured to receive the output of WGHR 416. In one embodiment, the output of the WGHR 416 is a nine bit value containing the branch history of the last nine branch instructions processed by the processor 100. The output of the selection mux 422 is used as input into the address hashing logic circuit 420 which indexes into the BHT 140 for the next conditional branch instruction.

The GHR 414 operates much like the WGHR 416, except the GHR 414 may be loaded with the branch history information during the DCD stage 410. The contents of the GHR 414 will mirror the contents of the WGHR 416 once the branch instruction passes through the DCD stage 410. Depending on the circumstances the output of the GHR 414 may be used to index the prediction value.

The output of the GHR 414 is coupled to the selection mux 422. When a BTAC miss occurs and it is determined during the DCD stage 410 that the instruction is confirmed as a taken branch instruction, the selection mux 422 is directed to select the output of the GHR 414 to be used by the address hashing logic circuit 420 for indexing. In this instance, the GHR 414 is used because the WGHR 416 does not yet have the branch history information for the taken branch (due to the BTAC miss). Alternatively, the output of the GHR 414 may also be used by the address hashing logic circuit 420 when a BTAC miss occurs because the WGHR 416 may have been updated by a subsequently fetched branch instruction prior to indexing the BHT 140 for the current branch instruction. In this instance, the WGHR 416 may not reflect the proper value for the current branch instruction and if used by the address hashing logic circuit 420 an incorrect entry in the BHT 140 may be indexed.

The output of the GHR 414 is also coupled to Branch Correction Logic circuit (BCL) 440. The BCL 440 uses the GHR 414 to provide a "true" copy of the branch history information which is used for recovery purposes should a mispredict occur.

When a mispredict occurs, the BCL 440 restores the branch history information in both the GHR 414 and WGHR 416. As mentioned previously, a mispredict occurs when a branch instruction reaches a resolution stage and the actual results do not match the predicted results.

When a mispredict occurs, the BCL 440 sends information to the fetch logic circuit 402 which directs the fetch logic circuit 402 to flush instructions that were fetched based on the mispredicted conditional branch instruction. In order to be more efficient, the BCL 440 may restore the GHR 414 and the WGHR 416 to the correct branch history information at the same time it provides the correct branch history information to the selection mux 422. When the mispredict occurs, the processor 100 may select the output of the BCL 440(through the selection mux 422) to be directed to the address hashing logic circuit 420 for use in indexing the appropriate counter 204.

When the processor 100 encounters a mispredict, the BCL 440 restores the GHR 414 and WGHR 416 to their proper values. In one embodiment, the BCL 440 may take a snapshot of the GHR 414 after the GHR 414 is loaded with a prediction value for a conditional branch instruction. The BCL 440 may then invert the most recent prediction value (e.g. the MSB) of the GHR 414. By taking the opposite of the prediction value, the BCL 440 prepares a corrected value which should be reflected in the GHR 414 and WGHR 416 if a mispredict occurs. For example, if after identifying a conditional branch instruction and its prediction value during the DCD stage 410, the GHR 414 and the BCL 440 are loaded with the value "101011111" (MSB =>LSB). The BCL 440 may flip the MSB corresponding to the conditional branch instruction and store the corrected value "001011111" linked to the conditional branch instruction. Thus, if the conditional branch instruction is incorrectly predicted, the corrected value is ready to be sent to the GHR 414, the WGHR 416 and the selection mux 422.

Figure 5:
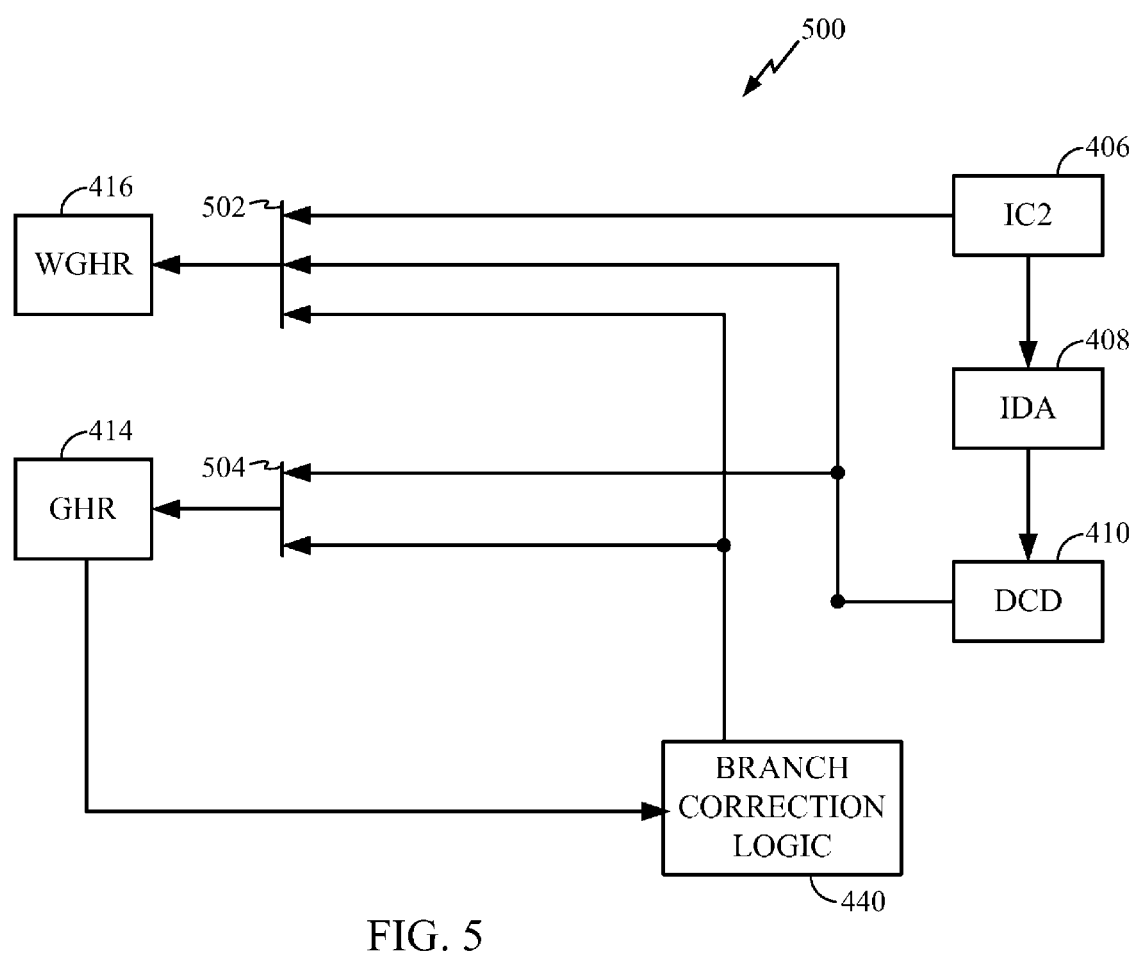
FIG. 5 shows a detailed view of the Working Global History Register and the Global History Register.

FIG. 5 displays a detailed view 500 of the WGHR 416, the GHR 414 and the BCL 440. Within the detailed view 500, a WGHR selection mux 502 receives branch history information from the IC2 stage 406, the DCD stage 410 as well as corrected branch history information from the BCL 440. A GHR selection mux 504 receives branch history information from the DCD stage 410 and corrected branch history information from the BCL 440.

The WGHR selection mux 502 selects which input is used to load the WGHR 416 with branch history information. When a mispredict occurs, the input from the BCL 440 has priority over information being sent from the IC2 Stage 406 or DCD stage 410. The BCL 440 has priority because subsequent branch history information following a mispredict may be associated with conditional branch instructions fetched down the incorrectly predicted branch path. Therefore, the branch history information passed by the IC2 stage 406 or DCD stage 410 may also be incorrect.

If no mispredict occurs, the input selection for the WGHR selection mux 502 may be determined according to the following examples listed from highest to lowest priority:

a) If a branch instruction returns a BTAC miss during the IC2 stage 406 but ends up predicted taken after being decoded during the DCD stage 410, the branch history value confirmed during the DCD stage 410 is shifted into the WGHR 416. The DCD stage 410 has priority in this case because instructions fetched after the predicted taken branch instruction need to be flushed. Therefore, any branch history information identified during the IC2 stage 406 for a subsequent branch instruction which may be ready to write into the WGHR 416 during the same processor cycle is discarded.

b) If the DCD stage 410 is not executing a branch instruction associated with a BTAC miss, the IC2 stage 406 will have the next highest priority. As long as a BTAC hit occurs for the branch instruction, the branch history information identified during the IC2 stage 406 is shifted in to the WGHR 416.

c) If a branch instruction has been previously identified as a BTAC hit and the associated branch history information was loaded according to the previously described example (b), the WGHR 416 will be rewritten once more from the DCD stage 410. As well, if a conditional branch instruction is a BTAC miss and the branch instruction is predicted not taken, the WGHR 416 is written with this branch history information. The writing of the WGHR 416 ensures that the GHR 414 and the WGHR 416 will be synchronized after the instruction passes through the decode stage 410.

The GHR selection mux 504 selects the appropriate input used to update the GHR 414. Similar to the WGHR selection logic 502, the GHR selection mux 504 gives the input from the BCL 440 the highest priority for the same reasons as explained above. Thus if no mispredict occurs, the GHR 414 is updated with branch history information identified during the DCD stage 410 for a particular branch instruction.

Figure 8:
FIG. 8 depicts the example group of instructions executed by the processor of FIG. 1.

FIG. 6 shows a timing diagram 600 of an exemplary group of instructions as they move through the upper pipe 450. Within the exemplary group of instructions 800 of FIG. 8 are multiple branch instructions. The X-axis 602 of FIG. 6 depicts the processor cycle and the Y-Axis 604 illustrates the execution stage within upper pipe 450 the instruction passes through as well as the contents of the GHR 414 and WGHR 416. The contents of the GHR 414 and the WGHR 416 are written to during one processor cycle and latched at the beginning of the next processor cycle. As reflected in the timing diagram 600, the latched contents are of the GHR 414 and WGHR 416 are displayed. For ease of illustration, only the three most significant bits of the GHR 414 and the WGHR 416 are shown. As the instructions are executed, the instructions move down the Y-axis 604.

In Processor Cycle 1, the fetch logic circuit 402 sends a fetch group address to the Instruction Cache 106, the BTAC 130 and address hashing logic circuit 420 for instruction A. This is shown in the timing diagram 600 as instruction A enters the IC1 Stage 404. Also in Processor Cycle 1, the three most significant bits of the GHR 414 and WGHR 416 are all zeros indicating that the last three branch instructions executed were all not taken.

In Processor Cycle 2 the results of sending the fetch group address to the instruction cache 106, the BTAC 130 and the BHT 140 are received. This is displayed in the timing diagram as instruction A entering the IC2 stage 406. Since the instruction cache 106 stores multiple instructions, instruction A+4 is also shown retrieved along with instruction A in the IC2 stage 406. Logic circuitry within the IC2 stage 406 analyzes the information received from the BTAC 130 and BHT 140. During the IC2 stage 406, the processor 100 determines that instruction A is a conditional branch instruction (based on the information from a BTAC hit) as well as the prediction value returned from the BHT 140. In this example, instruction A is predicted taken. The actual entry in the BHT 140 for instruction A may be either strongly taken (11) or weakly taken (10). At the end of Processor Cycle 2 the processor 100 loads in a "1" in the MSB of the WGHR 416 to reflect the prediction value associated with conditional branch instruction A. Since instruction A is predicted taken, the next sequential instruction (A+4) is flushed after instruction A passes through the IC2 stage 406 since instruction A+4 will not be the next instruction to be executed. As shown in the timing diagram 600, the value "100" is latched into the WGHR 416 at the start of Processor Cycle 3.

During Processor Cycle 3, instruction A enters the IDA stage 408. While in the IDA stage 408, instruction A is formatted and aligned, thus preparing the instruction to enter the DCD stage 410. While instruction A moves through the IDA stage 408, the fetch group address for instruction B is sent to the instruction cache 106, the BTAC 130 and BHT 140 during the IC1 stage 404.

In Processor Cycle 4, instruction A enters the DCD stage 410, the results from the fetch request for instructions B and B+4 are received (the IC2 stage 406) and the fetch group address for instruction B+8 is sent to the instruction cache 106, the BTAC 130 and BHT 140 (the IC1 Stage 404). The contents of WGHR 416 ("100") are selected by the selection mux 422 and are used by the address hashing logic circuit 420 for indexing the entry into the BHT 140 for instruction B+8. When instruction A is in the DCD stage 410, the processor 100 confirms that instruction A is a conditional branch instruction and as a result the prediction value ("1") is shifted into the GHR 414. The processor 100 will not see the updated value of the GHR 414 from instruction A until the beginning of Processor Cycle 5 when the processor 100 latches GHR 414. At the end of Processor Cycle 4, instruction A leaves the upper pipe 450 and is directed to lower pipelines 160 or 170 for further execution.

In a conventional processor that does not utilize a WGHR 416 and employs only a GHR to store branch history information and executed the exemplary group of instructions, the predicted value returned from a BHT for instruction B+8 may not be accurate. This is because the address hashing logic circuit would use the value of the GHR in Processor Cycle 4 to determine the entry in the BHT for instruction B+8, (e.g. the value "000" would have been used). This value of the GHR does not accurately reflect the actual branch history encountered by the processor because the branch history information for instruction A was not accurately reflected. If the same instruction sequence was subsequently executed, but this time, the processor experienced a delay when fetching instruction B+8, (i.e. the contents of the GHR were updated by the time the address hashing logic circuit used the value of the GHR to access the BHT) a different entry into the BHT may be accessed. In this case, a processor using only a GHR to store branch history information could access two different BHT entries for the same conditional branch instruction having the same instruction execution sequence.

In one embodiment, when instruction A is in the DCD stage 410, the WGHR 416 is rewritten with the prediction value the same time the GHR 414 is loaded. By writing both registers with the same prediction value at the same time, the two registers are synchronized for instruction A. Since it is uncommon that two conditional branch instructions will be predicted taken immediately following one another, there is little chance that synchronizing the two registers will lose any branch history information.

In Processor Cycle 5, instructions B and B+4 enter the IDA stage 408 while instructions B+8 and B+12 enter the IC2 stage 406. Also in Processor Cycle 5, the fetch group address for instructions B+16 and B+20 are sent to the instruction cache 106, BTAC 130 and BHT 140. In the IC2 Stage 406, instruction B+8 returns a BTAC hit. Since instruction B+8 is a BTAC hit, the processor 100 also determines that instruction B+8 is a conditional branch instruction and its prediction value returned from the BHT 140 during the IC2 stage 406 is shifted into the WGHR 416. In this example, instruction B+8 is also predicted taken. The actual entry in the BHT 140 may be either strongly taken (11) or weakly taken (10). Because instruction B+8 is a predicted taken branch instruction, instructions B+12, B+16 and B+20 will be flushed by the fetch logic circuit 402 after instruction B+8 leaves the IC2 stage 406 and the target address reflecting instruction C (received from the BTAC hit) is directed to the fetch logic circuit 402. The contents of the WGHR 416 are updated with the prediction value of taken ("1") and the value is latched at the beginning of Processor Cycle 6 as reflected in the timing diagram 600.

In Processor Cycle 6, instructions B and B+4 enter the DCD stage 410 while instruction B+8 enters the IDA stage 408. Also during Processor Cycle 6, the fetch group address for instruction C is sent to the Instruction Cache 106, BTAC 130 and BHT 140 (IC1 stage 404). At the end of Processor Cycle 6, instructions B and B+4 leave the upper pipe 450 and are directed to lower pipelines 160 or 170 for further execution.

In Processor Cycle 7, instruction B+8 is processed during the DCD stage 410. During the DCD stage 410, instruction B+8 is confirmed as a conditional branch instruction and its prediction value is also confirmed. The prediction value identified for instruction B+8 is shifted into the GHR 414 and reloaded into the WGHR 416 during Processor Cycle 7. Instructions C and C+4 are returned from the Instruction Cache 106 during the IC2 stage 406. At the end of Processor Cycle 7, instruction B+8 leaves the upper pipe 450 and is directed to lower pipelines 160 or 170 for further execution.

In code segments where branch instructions may be executed in close proximity to one another (based on the depth of the pipeline), the latest branch history information is used to process branch predictions.

During Processor Cycle 8, the value of the GHR 414 is latched along with the WGHR 416. Instructions C and C+4 are processed during the IDA stage 408 and any sequential instructions following instruction C and C+4 may be fetched and executed.

Figure 7:
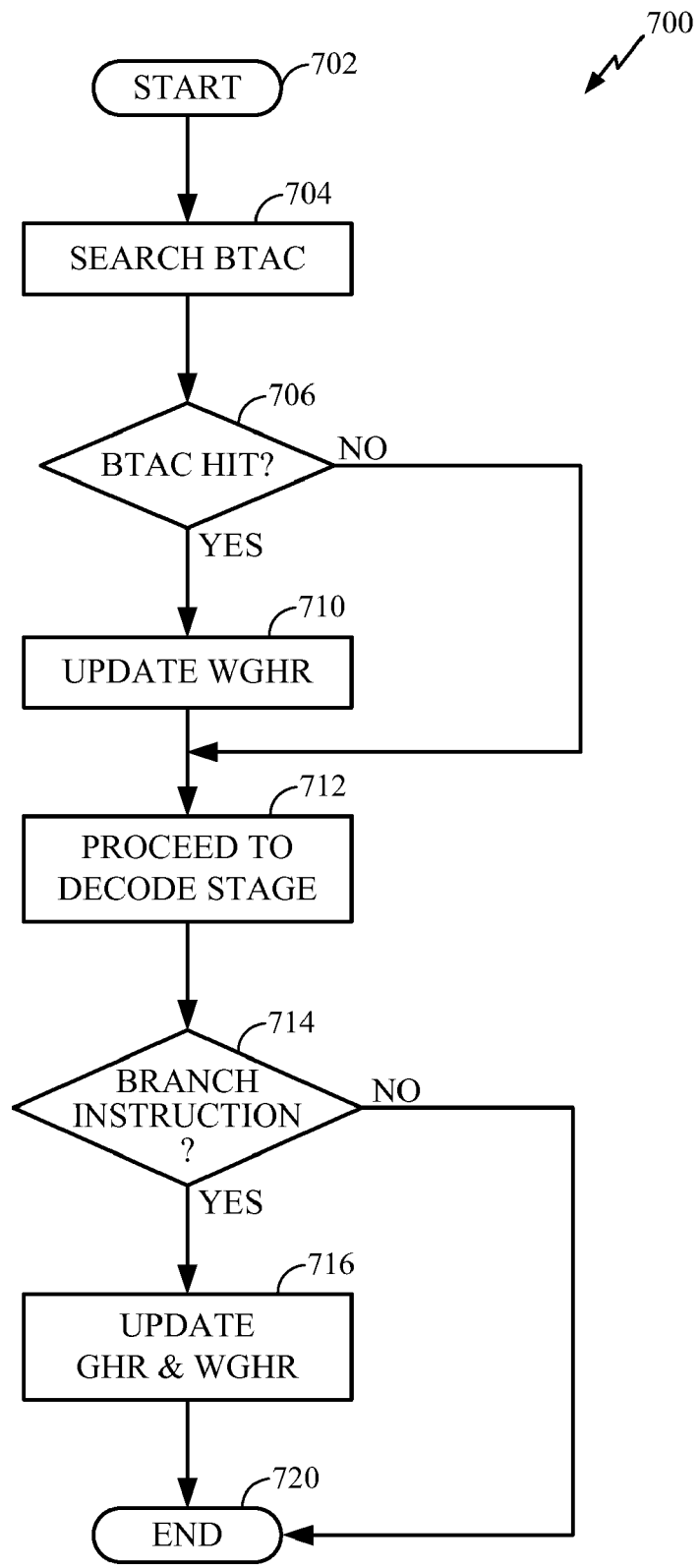
FIG. 7 shows a flow chart illustrating an instruction process flow performed by the processor of FIG. 1 using a Working Global History Register

FIG. 7 is a flow chart displaying an instruction process flow 700 taken by the processor 100 executing nstructions using a Working Global History Register (WGHR) 416. The instruction process flow 700 starts at block 702. The instruction process flow proceeds to block 704 where the fetch logic circuit 402 sends the fetch group address to the BTAC 130 and the address hashing logic circuit 420 (for indexing into the BHT 140). As mentioned previously, the sending of the fetch group address may occur during the IC1 stage 404 in the processor 100. At block 704, results of searching the BTAC 130 (to determine if the instruction being fetched is a branch instruction) are returned. The results are returned during the IC2 stage 406. From block 704, the instruction process flow 700 proceeds to decision block 706. The processor 100 determines if a BTAC hit has occurred at decision block 706. This determination may also occur during the IC2 stage 406. As explained previously, a BTAC hit may occur for a conditional branch instruction or a taken unconditional branch instruction. If there is no BTAC hit (e.g. a BTAC miss), the instruction process flow 700 proceeds directly to block 712.

If there is a BTAC hit, the instruction process flow 700 proceeds to block 710. At block 710, the WGHR 416 is updated by shifting the prediction value retrieved from the BHT 140 into the WGHR 416. For example, a "1" is shifted into the WGHR 416 if the branch instruction is predicted taken or a "0" is shifted in if the prediction is not taken. Depending upon the implementation, the prediction value may be returned during any processor execution stage prior to a decode stage. In the embodiment as previously described the WGHR 416 is updated during the IC2 stage 406.

The instruction process flow 700 proceeds to block 712 where the instruction passes through a Decode Stage (e.g. the DCD Stage 410). During the Decode Stage, at block 712, the instruction may be confirmed as a branch instruction. After the instruction is executed in the decode stage, the instruction process flow 700 proceeds to decision block 714. If at decision block 714, the instruction is not a branch instruction, the instruction process flow 700 ends at block 720.

If at block 714, the processor 100 confirms that the instruction is a branch instruction, the instruction process flow 700 proceeds to block 716. At block 716, the WGHR 416 and GHR 414 are updated with the appropriate branch history information and the instruction process flow ends at block 720.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of processing branch history information comprising:
   identifying a branch instruction in a first pipeline stage prior to a decode stage;
   at a mux, selecting branch history information associated with the branch instruction, wherein the mux is configured to receive the branch history information associated with the branch instruction prior to the decode stage and to receive corrected branch history information from a branch correction logic circuit;
   shifting the branch history information of the branch instruction into a first register, wherein the first register comprises a working global history register, wherein the working global history register stores branch history information for a plurality of previously processed branch instructions, and wherein the branch history information for the plurality of previously processed branch instructions comprises prediction values and resolution values of recently processed conditional branch instructions and branch directions of recently processed unconditional branch instructions;
   confirming the branch instruction in the decode stage;
   shifting the branch history information of the branch instruction into a second register during the decode stage, wherein the second register comprises a global history register that stores the branch history information for the plurality of previously processed branch instructions;
   wherein the contents of the second register mirror contents of the first register after the branch instruction is decoded by the decode stage and wherein an output of the mux is sent to an address hashing logic circuit to determine an address index for an entry in a branch history table; and
   when a misprediction occurs, the branch correction logic circuit restores the branch history information in both said first and second registers to correct the branch history information at the same time it provides the correct branch history information to the mux.

2. The method of claim 1, wherein the branch instruction is identified in response to a Branch Target Address Cache (BTAC) hit.

3. The method of claim 1, wherein the branch instruction is identified in response to a Branch Target Instruction Cache (BTIC) hit.

4. The method of claim 1, wherein the first pipeline stage is an instruction cache stage.

5. The method of claim 1, wherein the first register and the second register are 9-bit shift registers.

6. The method of claim 1, wherein the branch instruction is a conditional branch instruction.

7. The method of claim 1, wherein the branch instruction is an unconditional branch instruction.

8. The method of claim 1, wherein an output of the first register is sent to an address hashing logic circuit to determine an address index for an entry in a branch history table.

9. The method of claim 1, wherein an output of the first register is a multi-bit value including the branch history information of the plurality of previously processed branch instructions.

10. The method of claim 9, wherein the output of the first register is a nine bit value containing the branch history information of nine previously processed branch instructions.

11. The method of claim 1, wherein the decode stage identifies a type of instruction.

12. The method of claim 1, wherein the branch history information shifted into the second register is forwarded to an address hashing logic circuit to obtain an index into a branch history table in response to a second branch instruction being detected prior to decoding the first branch instruction during the decode stage.

13. The method of claim 1, wherein the mux is further configured to receive an input from the decode stage.

14. A method of processing branch history information comprising:
   fetching a branch instruction;
   identifying the branch instruction in a first pipeline stage prior to a decode stage of a pipeline;
   at a mux, selecting first branch history information associated with the branch instruction, wherein the mux is configured to receive the first branch history information associated with the branch instruction prior to the decode stage and to receive second branch history information from the decode stage;
   shifting the first branch history information for the branch instruction into a first register during the first pipeline stage prior to the decode stage, wherein the first register comprises a working global history register, wherein the working global history register stores branch history information for a plurality of previously processed branch instructions; and
   confirming the branch instruction in the decode stage, wherein the first branch history information for the branch instruction is shifted into a second register during the decode stage, wherein the second register comprises a global history register that stores the branch history information for the plurality of previously processed branch instructions;
   wherein the contents of the second register mirror contents of the first register after the branch the first branch instruction is decoded by the decode stage and wherein an output of the mux is sent to an address hashing logic circuit to determine an address index for an entry in a branch history table; and
   when a misprediction occurs, a branch correction logic circuit restores the branch history information in both said first and second registers to correct the branch history information at the same time it provides correct branch history information to the mux.

15. The method of claim 14, wherein identifying the branch instruction occurs when a Branch Target Address Cache (BTAC) hit is received.

16. The method of claim 14 wherein the first pipeline stage is an instruction cache stage.

17. The method of claim 14, wherein the first branch history information shifted into the second register is forwarded to an address hashing logic circuit to obtain an index into a branch history table in response to a second branch instruction being detected prior to decoding the first branch instruction during the decode stage.

18. The method of claim 14, wherein the mux is further configured to receive third branch history information as input from a branch correction logic circuit.

* * * * *